Feb. 21, 1961

W. C. NILGES 2,972,260

INDEXING HEAD

Filed Nov. 28, 1955

INVENTOR.
William C. Nilges
BY Hough and Hough
Attorneys

Feb. 21, 1961   W. C. NILGES   2,972,260
INDEXING HEAD

Filed Nov. 28, 1955   2 Sheets-Sheet 2

INVENTOR.
William C. Nilges
BY Slough and Slough
Attorneys

2,972,260

INDEXING HEAD

William C. Nilges, 30813 Walker Road, Bay Village, Ohio

Filed Nov. 28, 1955, Ser. No. 549,376

1 Claim. (Cl. 74—396)

My invention relates to lathe attachments and relates more particularly to that type of lathe attachment which is commonly termed an indexing head.

It is an object of my invention to provide an indexing head of the type referred to which is adaptable for use with different size and types of work and which will be adjustable to dispose said work at any preferred angle to the cutter.

It is a further object of my invention to provide an indexing head of the type referred to which may be adaptable for use with ordinary type lathes.

Another object of my invention is to provide an indexing head of the type referred to which may be affixed to a lathe in the place of a compound slide assembly.

My present application is a continuation in part of my application for United States Letters Patent filed February 9, 1952 bearing Serial No. 270,839 now abandoned.

In devices of the prior art with which I am familiar the indexing accuracy depends upon the initial fit of the worm and gear. Subsequent wear of the same increases the backlash and impairs the accuracy of the indexing head for certain dividing operations and undesirable "chatter" of the main spindle occurs resulting in inaccurate work and a poor finish thereon.

This is especially true of those machining operations in devices of the prior art where such operations require a continuous feed of the work piece over a certain angular span against an intermittent cutting tool, as for example, in milling a kidney-shaped slot of a definite angular span using an intermittent type of cutter, such as a flycutter or milling cutter; either one of these cutters does not cut continuously and if appreciable backlash is present in the gears, the pounding action of the intermittent cut induces a spindle oscillation which makes accurate location of the ends of the slot members impossible, and in addition the rapidly varying relative speed of cutter and work induces additional vibration of the milling cutter resulting in excessive "chatter" and spoiled work due to poor surface finish and inaccurate location of the slot.

For other indexing operations, however, where the indexing mechanism need not be reversed under load and where the work piece may be indexed from position to position in the same direction and the spindle locked while the work is being performed at any given position, such as drilling a series of holes, preloading of the gears would not be desirable since it would slow up the indexing operation, due to tightness of the hand wheel caused by the binding of the gears, which is necessary in the case of the circular milling operation previously referred to.

It is therefor an object of my invention to provide a convenient and quickly adjustable means for compensating for normal wear of the indexing gear elements and for setting the proximity of the index gear to the degree determined by the work at hand.

In devices of the prior art with which I am familiar, the index gears are not easily disengaged and it is not possible to rapidly rotate the spindle on which the work piece is mounted independently of the gears. Simple and quick disengagement in my invention enables me to reduce the time required to set a reference or starting point of the work piece on center with the axis of the index spindle; and since the index gears may be released, the spindle may be rotated rapidly by hand to check work piece position, rather than by slowly turning the hand wheel through the gear reduction, as in the prior art devices.

It is an object of my invention, moreover, to provide means whereby such releasing and re-engaging of the gears will not effect the previously set backlash adjustment, for it may be that successive pieces are worked on, or it may be necessary to recheck concentricity of the work piece in the middle of a job. The improved means of my invention for accomplishing the above are simple, rugged and able to maintain the setting of the gears in spite of normal duress.

I have, furthermore, provided that any adjustments of backlash or re-engagement of gears automatically tend to urge the axis of the worm gear to lie in a plane at right angles to the axis of the work piece spindle, so that accuracy of the gear mesh is maintained.

A still further object of my invention is to provide an indexing head of the type referred to which will be composed of but few parts, economical in manufacture, simply and quickly operated, accurate and highly efficient in use.

Further objects of my invention and the invention itself will become more readily apparent by reference to the appended description, in which description reference will be made to the accompanying drawings, in which drawings.

Figures 1, 2:
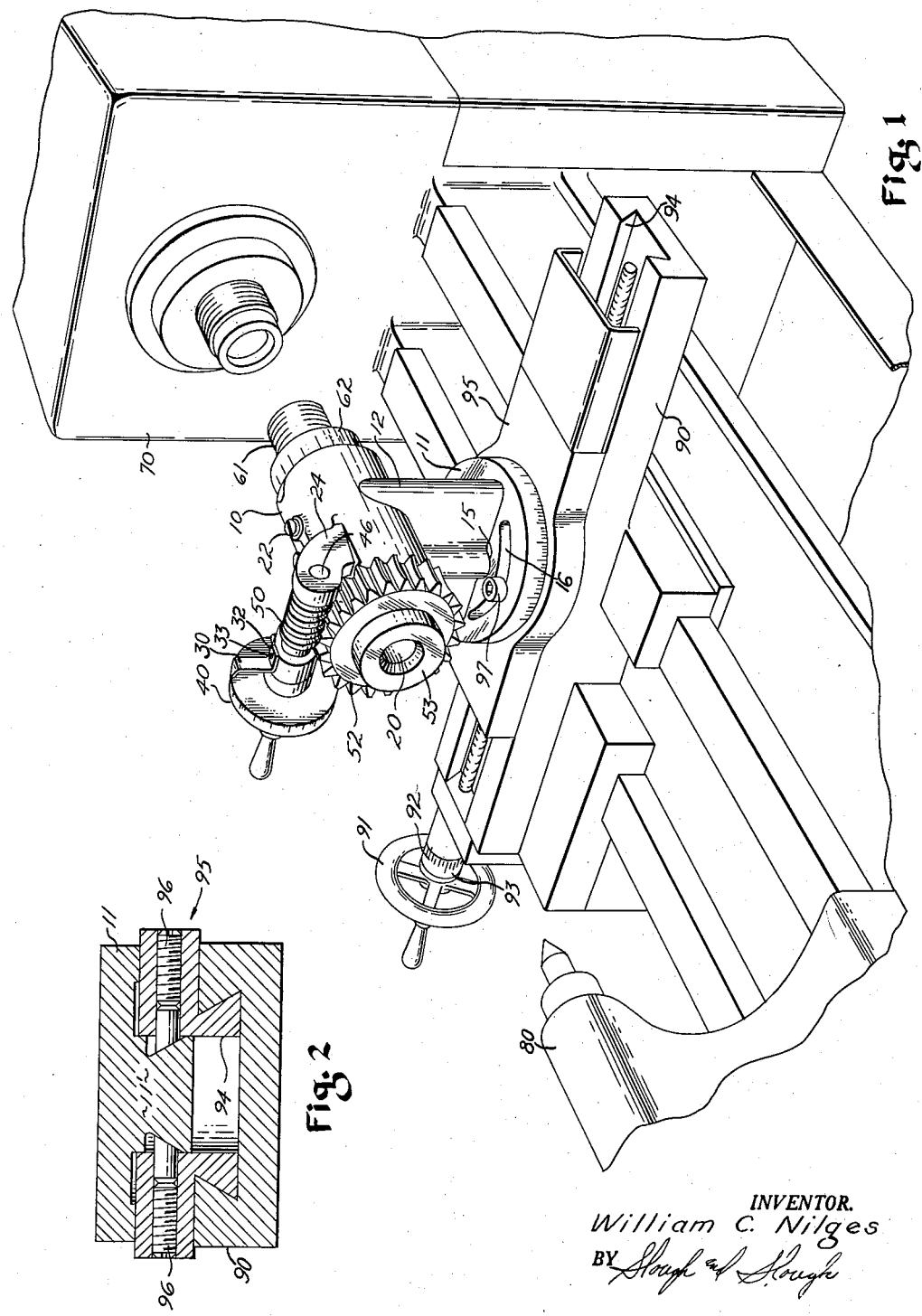
Fig. 1 is a view of the indexing head of my invention applied to the cross slide of a conventional lathe.
Fig. 2 is a cross sectional view of the base of the section head as adapted to the cross slide.

The indexing head of my invention which is adapted to be carried by the cross-slide of an ordinary lathe comprises a generally cylindrical head portion 10 secured by a plurality of leg elements 12, 13, 14 and 15, to a cylindrical base 11, said base having an arcuate slot 16 disposed on one side thereof adjacent the outer periphery thereof, as best illustrated in Figs. 1, 4, 5 and 6. A sub-base 11' is secured to the base 11 and said sub-base is adapted to be carried in the guideway of the slide plate of the conventional lathe.

The body portion 10 of the indexing head is provided with a centrally disposed bore 20 within which a spindle 60 is disposed, said spindle being disposed at right angles to the axis of the base and being provided with a forwardly disposed threaded chuck end 61, an enlarged collar 62 being disposed adjacent thereto and a shaft portion 64 at the rearward end of said spindle having a key-way 66 for keying said shaft portion to a large worm gear 52. The spindle 60 is preferably tubular and at its forward end is provided with a tapered work-receiving nose 64' wherefor a collet may be placed in the nose of the spindle of the indexing head for small work and the threaded portion 61 of the spindle may alternatively be adapted to receive standard type chucks by screw-threaded engagement therewith.

Figure 3:
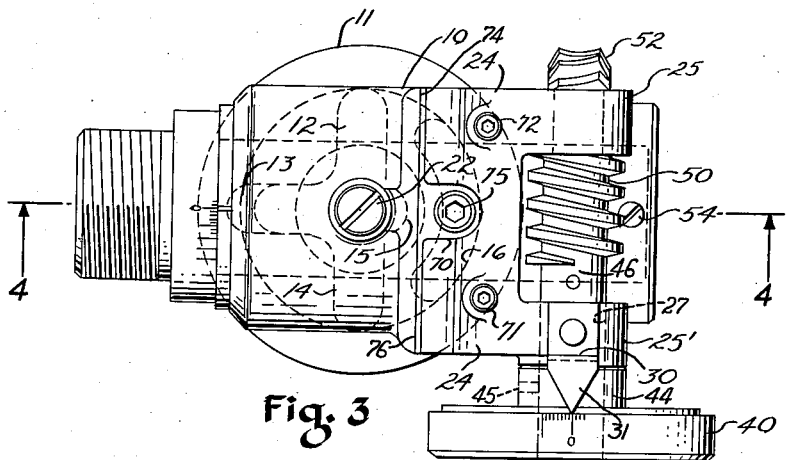
Fig. 3 is a top view of the indexing head of my invention.

The worm gear 52 is adapted to receive the worm 50 affixed to a cross shaft 46 disposed at the rear, carried by a generally U-shaped bracket 24 having a pair of bored shoulder portions 25, 25' through which said worm shaft extends, as best shown in Figs. 1 and 3. The worm 50 is carried within the yoke of said bracket.

Figure 5:
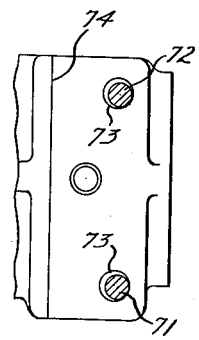
Fig. 5 is a top plan view of the gear end of the body, showing a shelf for the gear adjustment means of my invention.
Figure 4:
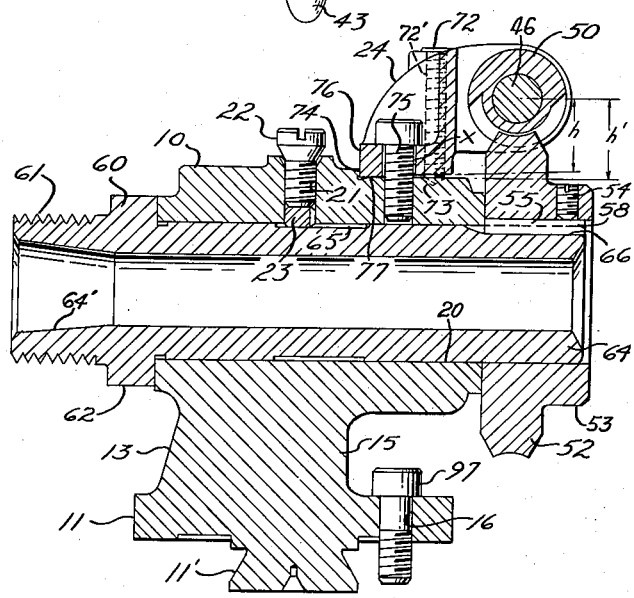
Fig. 4 is a sectional view taken on the line 4—4 of Fig. 3.

The more forwardly disposed portion of the bracket 24 is provided with a U-shaped indent portion 70 for purposes later to be described herein and is provided with a pair of parallel aligned openings 71' and 72' into which preferably conical pointed socket head set screws 71 and 72 are threaded. The cone points of these set screws, as best shown in Figs. 4 and 5, bear in offset conical countersinks 73 in the body.

It is to be noted that the countersinks 73 are closer to the locating shoulder 74 provided on the body than the tipped holes 71' and 72' in the bracket, so that when these screws are tightened the bracket 24 moves up against the locating body shoulder 74.

The worm bracket 24 is secured to the body 10 by means of a cap screw 75, a normal clearance as indicated at X about the cap screw being provided. The face 76 of the worm bracket 24 bears against the locating shoulder 74 of the body and aligns the worm shaft 46 and the worm 50 at right angles to the spindle 60. In Fig. 4 the worm is shown engaged at zero backlash to the gear 52. In this position, since the distance of the worm bracket 24 at h is machined less than the distance h', the worm bracket is tipped upward resting on the two pillar screws 72 and 71 and on the front edge of the worm bracket 24. The worm bracket 24 and consequently the worm 50 is properly positioned by the shoulder 74 of the body.

Further since the worm bracket may tip downwards a considerable distance before contacting the body, as shown, substantial adjustment is available in my device for wear.

At the free end of the shaft 46 which projects through an opening 27 in the bracket arm 25', the shaft carries a hand wheel 40 bearing graduations in one-tenths of a degree through ten degrees. The worm bears such a relationship to the worm gear that it preferably has a 36:1 ratio so that the collar 62, which is divided into three hundred and sixty degrees, may be controlled by the hand wheel 40 over the entire range of adjustment of a circle wherefore the work may be disposed at any angle to the head stock 70 as may be desired.

A lock screw 22 is disposed centrally of the top of the body portion 10 and is adapted to contact a brass piece 23 disposed within the opening 21 therein to lockingly retain the spindle 60 in any adjusted position in which the same may be placed. The hand wheel 40 is rotated by means of the handle 43 secured thereto and the hand wheel 40 has a boss 44 secured at the opposite face thereof, a set screw 45 securing said boss and hand wheel to the shaft 46.

An indicator 30, generally Z-shaped in form, is carried at the upper end of the bracket 25 and carries at its free end an arrow 31, the opposite end 32 of the indicator 30 being secured to the bracket 25 by means of a screw 33 disposed within the bracket 25.

The worm gear 52 is provided with a boss 53 wherefore the worm gear is secured by means of the set screw 54 and the key 55 to the shaft end 64 of the spindle 60. The spindle 60 is provided at the central portion with a portion of relatively smaller diameter than the remaining shaft portion and the piece 23 is secured thereto by means of the set screws 22 to lock the spindle, as aforesaid.

When it is desired to rotate the work carried by the chuck to dispose the work at a desired angle to the cutting tool, for example, the hand wheel 40 is rotated by the handle 43 to position the work at the angle indicated generally by measurements on the indicating collar 62, and accurately by the degree in tenths indicated by the measurements on the hand wheel 40.

It is contemplated that said indexing head could be combined with a milling attachment mounted upon the cross-slide of a lathe to achieve vertical feed of the work and so as to angle the same to the cutter in the plane of the indexing spindle as well as for various allied uses.

In Fig. 1 the indexing head of my invention is shown applied to the conventional lathe and at 70 I show the head stock and at 80 the tail stock thereof, the cross slide being indicated generally at 90 has a collar 92 upon which graduations 93 are disposed, according to the conventional form, wherefore the feed may be read in thousandths. The sub-base 11' is, as previously described herein, carried in the guide way 94 of the slide plate 95 of the cross slide 90. A plurality of screws 96—96 are adapted to secure the sub-base to the slide plate. A cap screw 97 is adapted to be disposed through the arcuate slot 16 of the base 11 for purpose later disclosed herein.

To operate the indexing head of my invention, after the indexing head has been secured to the cross slide, the indexing head is clamped in place at any desired angle to the lathe spindle by using the graduations about the periphery of the base 11, as best shown in Fig. 1, the graduations beginning with zero degrees and proceeding about the periphery on either side of zero to 90 degrees therefrom and being suitably divided as into ten degree graduations. Additional holding power for heavy work is gained by using the cap screw 97 which is screwed through slot in the base onto the cross slide.

The work is positioned as by chuck means disposed on the spindle of the indexing head or within a collet upon the spindle of the indexing head of my invention. By rotating the cross slide feed hand wheel 91 to the desired positioning as shown by the graduations thereon, the indexing head is positioned fore and aft on the cross feed slide for the first operation on the work. By rotating the hand wheel 40 the work is set in the proper position for the first work operation which is generally in the plane at right angles to the indexing head spindle 60. The spindle 60 may be locked in place by means of the lock screw 22 and locking piece 23 if desired.

Succeeding work operations are performed by further rotating the hand wheel 40, reference being had to the graduations upon the enlarged collar 62 rotated thereby for approximate angular positioning of the work while still further rotation of the hand wheel 40 in reference to the graduations thereon accurately determines the exact angular positioning where such is desired.

To secure a change in the fore and aft or lateral positioning of the work with respect to the lathe spindle center line, the cross feed hand wheel 91 is turned and the position of the indexing head is shifted with respect to the lathe spindle. It will be appreciated that any angular shift of the work in the plane of the base on the indexing head may be accomplished by utilizing the graduations on the base of such head. Persons experienced in the art to which my invention pertains will realize from the foregoing how this may be accomplished.

In operation, the cap screw 75 is kept tightened. To adjust the backlash the following method is followed:

To increase the backlash, tighten the two conical set screws 71, 72 since these are located, as referred to hereinbefore, a substantial distance from the pivot point 77, while the cap screw 75 is close to the pivot point 77 the worm bracket will tip upward away from the bracket shelf on the body.

To decrease the clearance, the set screws 71, 72 are loosened, while at the same time the cap screw 75 is kept tight, thus decreasing the backlash due to the offset between the cone ends of the screws 71, 72 and the conical countersink 73 and, the bracket 24 is urged tightly against the shoulder 74 of the body 60, thus maintaining correct mesh of gears.

In order to disengage the gears for rapid rotation of the spindle, which is desirable to reduce the time required to set a reference or starting point of the work piece on center with the axis of the indexing spindle, it is only necessary to remove the cap screw 75 and the entire worm bracket 24 lifts off. Gears are simply and easily re-engaged by setting the bracket on the shaft 69 and tightening the cap screw. The backlash is unchanged since the position of the set screws 71, 72 has not been altered in the process. Further the worm 50 is automatically aligned and correctly positioned with the worm wheel 52 by the conical ends of said screws 71, 72 bearing in the offset countersink 73, and the worm bracket is automatically forced against the shoulder and aligns the bracket endwise when the cap screw 75 is tightened.

It is further obvious that numerous and extensive departures may be made, such as changes in size, methods and attachments, degrees of measurements, type of spindle, etc., without departing from the spirit of my invention and the scope of the appended claim.

What I claim is:

An indexing device which comprises a centrally bored body portion, a spindle, a worm gear secured to said spindle, a worm shaft adapted to engage said worm gear to rotate said spindle, indexing means carried by the worm shaft, adjustment means secured to said body portion, said means comprising a U-shaped bracket having a pair of bored shoulder portions, said worm shaft extending through said bored shoulder portions, said bracket being provided with a U-shaped indent portion and with a pair of aligned openings, said bracket being secured to the body by screw means disposed through the said U-shape indent, support pillars threaded into said aligned openings, countersinks in said body portion, said pillars being provided with conical ends bearing in said countersinks, said body portion having a locating shoulder, said countersinks being located nearer the locating shoulder on the body than at said pillar portions so that when said pillars are tightened the bracket moves against the said locating shoulder.

References Cited in the file of this patent

UNITED STATES PATENTS

| | | |
|---|---|---|
| 343,980 | Brainard | June 22, 1886 |
| 864,873 | Theil | Sept. 3, 1907 |
| 1,000,084 | Fredrickson | Aug. 8, 1911 |
| 1,024,254 | Garret | Apr. 23, 1912 |
| 1,084,062 | Best | Jan. 13, 1914 |
| 1,312,277 | Shields et al. | Aug. 5, 1919 |
| 1,939,266 | Kearney | Dec. 12, 1933 |
| 2,042,847 | Holtschneider | June 2, 1936 |
| 2,771,169 | Wahlstrom | Nov. 20, 1956 |